US012445066B2

(12) United States Patent
Griswold et al.

(10) Patent No.: US 12,445,066 B2
(45) Date of Patent: Oct. 14, 2025

(54) PIEZOELECTRIC ENERGY HARVESTERS AND SENSORS BASED ON STRAIN IN MECHANICAL STRUCTURES

(71) Applicant: TDK Corporation, Tokyo (JP)

(72) Inventors: Ryan Griswold, San Jose, CA (US); Vibhu Vivek, San Jose, CA (US)

(73) Assignee: TDK CORPORATION, Tokyo (JP)

( * ) Notice: Subject to any disclaimer, the term of this patent is extended or adjusted under 35 U.S.C. 154(b) by 1145 days.

(21) Appl. No.: 17/221,452

(22) Filed: Apr. 2, 2021

(65) Prior Publication Data

US 2022/0321032 A1   Oct. 6, 2022

(51) Int. Cl.
| | |
|---|---|
| *H02N 2/18* | (2006.01) |
| *B62J 45/42* | (2020.01) |
| *G01L 1/16* | (2006.01) |
| *B62J 45/41* | (2020.01) |

(52) U.S. Cl.
CPC ............ *H02N 2/186* (2013.01); *B62J 45/42* (2020.02); *G01L 1/16* (2013.01); *B62J 45/41* (2020.02)

(58) Field of Classification Search
CPC ........... H02N 2/186; B62J 45/41; B62J 45/42; G01L 1/16
USPC ........................................................ 310/339
See application file for complete search history.

(56) References Cited

U.S. PATENT DOCUMENTS

| | | | |
|---|---|---|---|
| 6,339,956 B1 | 1/2002 | Huinink et al. | |
| 2006/0119224 A1* | 6/2006 | Keolian | H02N 2/18 310/339 |
| 2010/0274607 A1 | 10/2010 | Carresjo et al. | |
| 2011/0308683 A1 | 12/2011 | Crano | |
| 2020/0049581 A1 | 2/2020 | Thornham et al. | |

FOREIGN PATENT DOCUMENTS

EP   2186657 A1   5/2010

OTHER PUBLICATIONS

Extended European Search Report issued in related European Patent Application No. 22207708.3 dated Apr. 4, 2023.

* cited by examiner

*Primary Examiner* — Emily P Pham
*Assistant Examiner* — Monica Mata
(74) *Attorney, Agent, or Firm* — Morgan, Lewis & Bockius LLP

(57) ABSTRACT

Piezoelectric devices mountable on a rigid mechanical structure are described. A piezoelectric device includes one or more piezoelectric elements and one or more supporting structures. A respective supporting structure of the one or more supporting structures has a flat or non-flat surface and is mechanically coupled with a piezoelectric element of the one or more piezoelectric elements so that a mechanical force on the one or more supporting structures is converted into an electrical signal by the one or more piezoelectric elements. A piezoelectric device system including two or more piezoelectric devices and a method for generating electrical signals are also described.

20 Claims, 9 Drawing Sheets

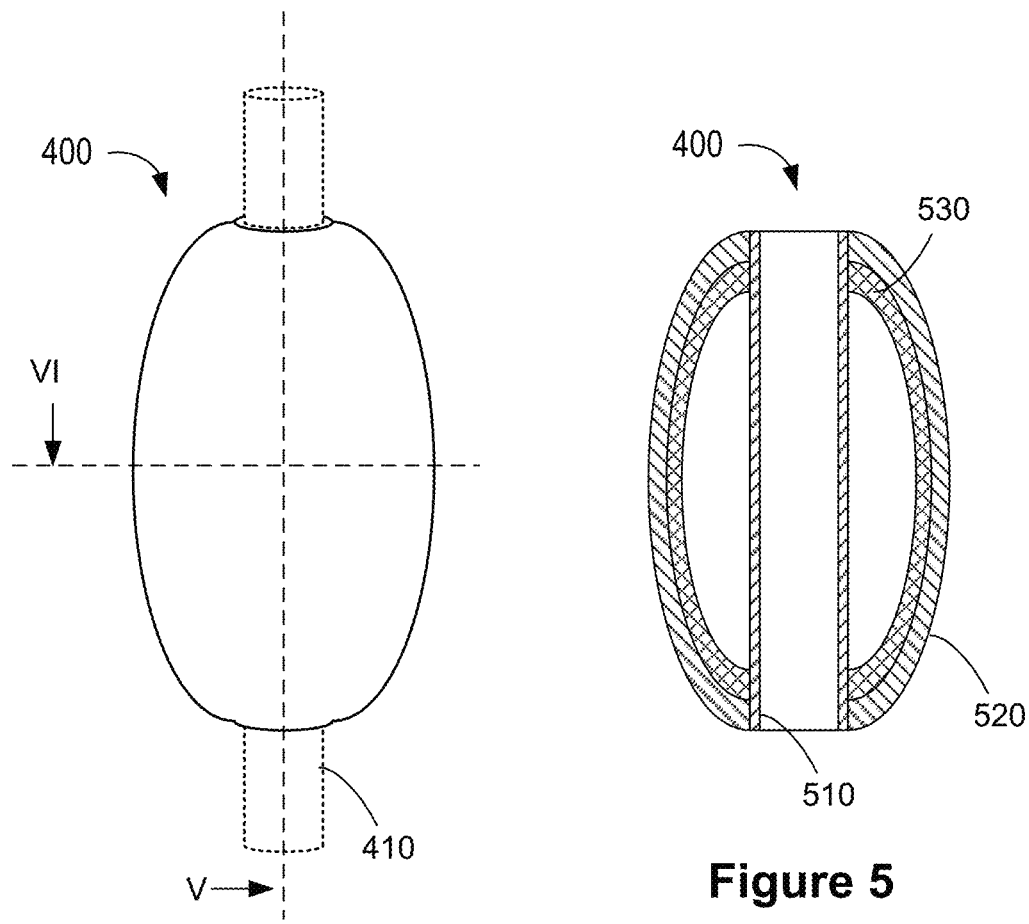
Figure 4
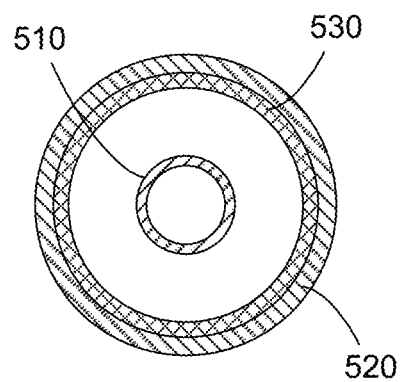
Figure 5
Figure 6

PIEZOELECTRIC ENERGY HARVESTERS AND SENSORS BASED ON STRAIN IN MECHANICAL STRUCTURES

TECHNICAL FIELD

This application relates generally to energy harvesters and strain sensors, and more particularly to energy harvesters and strain sensors that operate based on strain in adjacent mechanical structures.

BACKGROUND

Advances in distributed sensor networks have improved the safety and performance of various systems, which has led to a greater demand for advanced sensing applications to complement existing systems.

SUMMARY

Distributed sensor networks typically require a large number of sensors. However, many of these sensors require electrical power for operation and data transmission. In addition, frequent measurements (and transmission) of data have increased an amount of power required for such sensors. Energy storage devices (e.g., lithium ion batteries) have a limited capacity and often present challenges associated with low durability, difficulty of replacement, and inferior sustainability. Such energy storage devices are typically subjected to accelerated discharge cycles, resulting in frequent or premature replacement of entire sensor modules, thereby increasing the overall cost of ownership and maintenance for the distributed sensor networks.

The devices and methods described herein address challenges associated with conventional devices and methods for providing electrical power to various electrical components. The disclosed energy-harvesting devices (e.g., an electrical power generator that converts kinetic and mechanical energy, such as rotation, acceleration, deceleration, compression, tension, and/or vibration of various mechanical structures into electrical energy) may replace conventional energy storage devices or, when used in conjunction, prolong the life expectancy of such energy storage devices. Such devices are typically mounted where the source energy (e.g., kinetic or mechanical energy) is readily available (e.g., adjacent to a mechanical component that is subject to varying degrees of strain). Additionally or alternatively, energy-harvesting devices may be used as sensors, as the electrical signal from the energy-harvesting devices typically contains information about the movement and stresses of the energy-harvesting devices and mechanical structures on or in which the energy-harvesting devices are mounted.

In accordance with some embodiments, a piezoelectric device mountable on a rigid mechanical structure includes one or more piezoelectric elements and one or more supporting structures. A respective supporting structure of the one or more supporting structures has a non-flat surface and is mechanically coupled with a piezoelectric element of the one or more piezoelectric elements so that a mechanical force on the one or more supporting structures is converted into an electrical signal by the one or more piezoelectric elements. In some embodiments, a non-flat surface includes a surface that becomes non-flat when mechanical force is applied (e.g., the surface becomes flat when no mechanical force is applied).

In accordance with some embodiments, a piezoelectric device system includes two or more piezoelectric devices. A respective piezoelectric device of the two or more piezoelectric devices corresponds to any piezoelectric device described herein.

In accordance with some embodiments, a method for generating electrical signals includes providing a mechanical force on any piezoelectric device described herein so that the one or more piezoelectric elements of the piezoelectric device generate electrical signals. The method also includes providing the electrical signals from the piezoelectric device to power one or more electrical components or to provide information indicating mechanical movement of, or force applied on, a portion of an object on which the piezoelectric device is mounted.

BRIEF DESCRIPTION OF THE DRAWINGS

The disclosed devices and methods allow electrical connection between an energy-harvesting device and other electrical components located inside a tire and/or a wheel.

For a better understanding of the various described embodiments, reference should be made to the Description of Embodiments below, in conjunction with the following drawings in which like reference numerals refer to corresponding parts throughout the figures.

FIG. 4 illustrates a piezoelectric device in accordance with some embodiments.

FIG. 5 is a longitudinal cross-sectional view of the piezoelectric device shown in FIG. 4.

FIG. 6 is a transversal cross-sectional view of the piezoelectric device shown in FIG. 4.

DESCRIPTION OF EMBODIMENTS

Reference will be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these particular details. In other instances, methods, procedures, components, circuits, and networks that are well-known to those of ordinary skill in the art are not described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cantilever could be termed a second cantilever, and, similarly, a second cantilever could be termed a first cantilever, without departing from the scope of the various described embodiments. The first cantilever and the second cantilever are both cantilevers, but they are not the same cantilever.

The terminology used in the description of the embodiments herein is for the purpose of describing particular embodiments only and is not intended to be limiting of the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
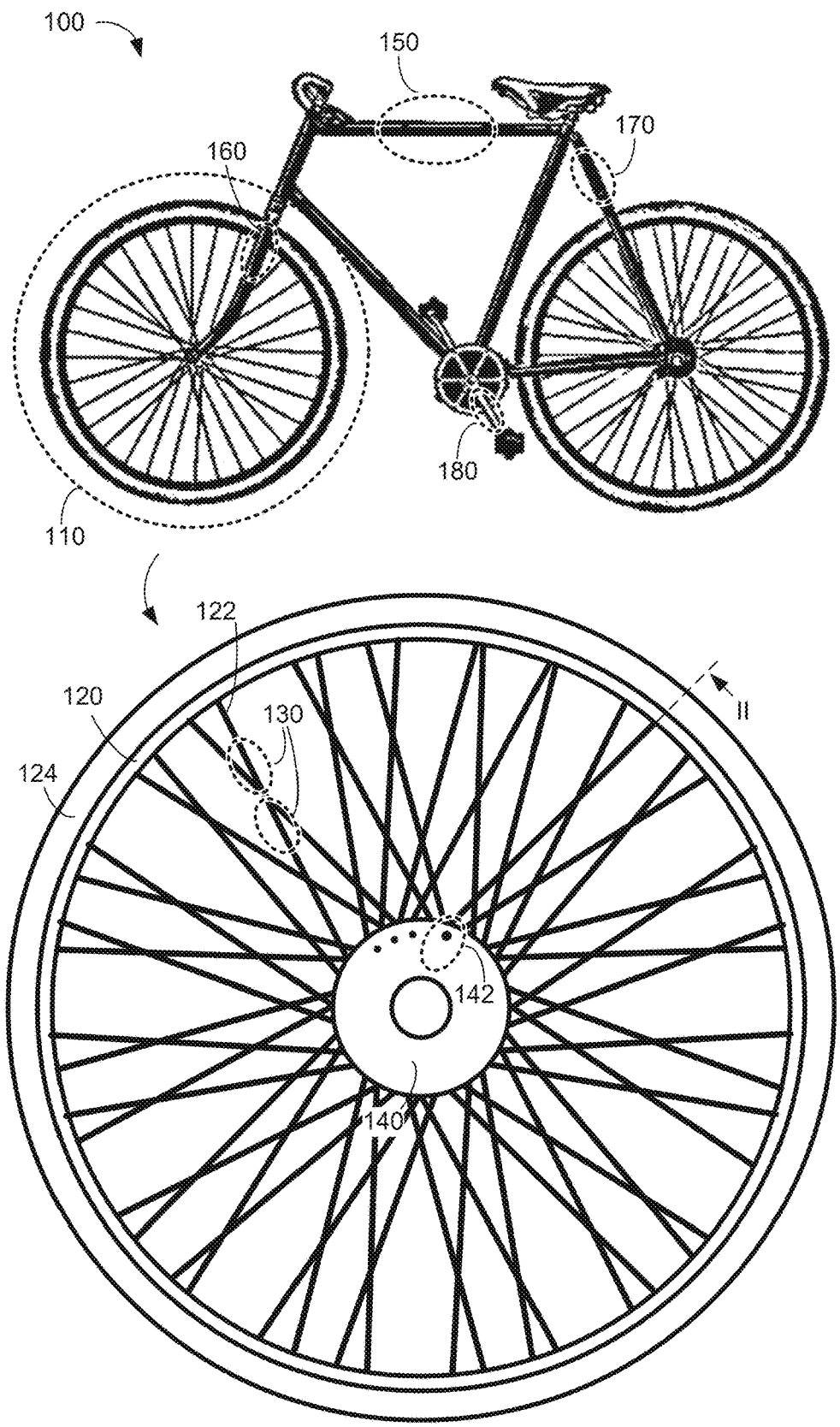
FIG. 1 is a schematic diagram illustrating parts of a bicycle in accordance with some embodiments.

FIG. 1 is a schematic diagram illustrating parts of a bicycle 100 (also called herein a vehicle) in accordance with some embodiments. Although the bicycle 100 is used as an example throughout this application, the piezoelectric devices described herein may be used in other vehicles, such as an automobile, any other automotive vehicles, or any personal transportation vessels or vehicles.

The bicycle 100 includes a frame and one or more wheels 110 (e.g., in FIG. 1, the bicycle 100 includes two wheels 110). In some embodiments, the frame includes one or more of: a top tube 150, a down tube, a seat tube, a seat stay 170, a chain stay, a head tube, or a fork 160. In some embodiments, the bicycle 100 also includes crank arms 180 coupled to a crank gear.

The wheel 110 includes a rim 120 and a tire 124 mounted on the rim 120. The rim 120 is coupled with a plurality of spokes 122, which extend to a hub 140 of the wheel 110. In some embodiments, the spokes 122 are coupled to hub holes 142 (also called spoke holes) of the hub 140 (e.g., using a hub hook).

FIG. 1 also shows one or more piezoelectric devices coupled to a single spoke. In some embodiments, the wheel 110 includes only one piezoelectric device on a respective spoke. In some embodiments, the wheel 110 includes two or more piezoelectric devices on a same spoke. In such embodiments, the two or more piezoelectric devices may be electrically coupled in parallel or in series.

Figure 2:
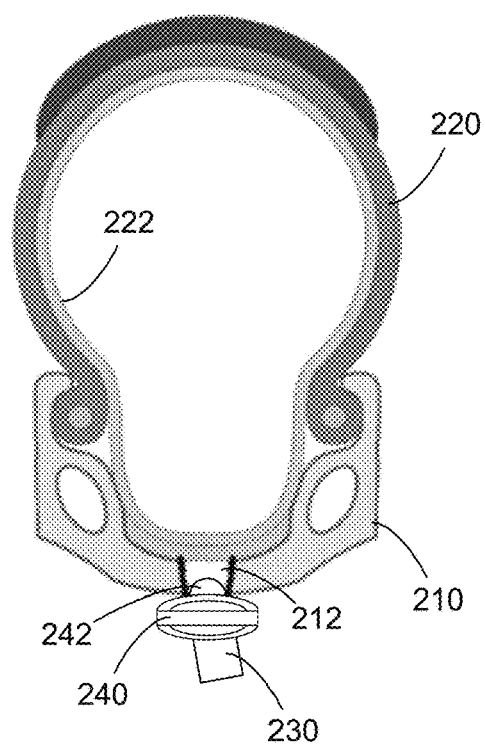
FIG. 2 is a cross-sectional view of a bicycle wheel in accordance with some embodiments.

A cross-sectional view of a bicycle wheel (e.g., wheel 110) is shown in FIG. 2. FIG. 2 shows a rim 210 on which a tire 220 and a tube 222 are mounted. In some embodiments, a piezoelectric device 240 is coupled with a nipple hole 212 of the rim 210 (e.g., the piezoelectric device 240 may include a protrusion 242 for coupled with the nipple hole 212). In some embodiments, the piezoelectric device 240 includes a spoke coupler 230 (e.g., a threaded coupler) for coupling with a spoke.

Figure 3A:
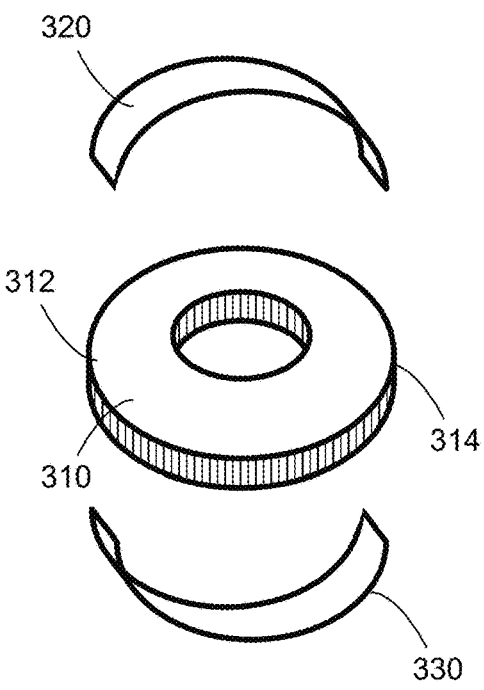
FIGS. 3A and 3B illustrate piezoelectric devices in accordance with some embodiments.
Figure 3B:
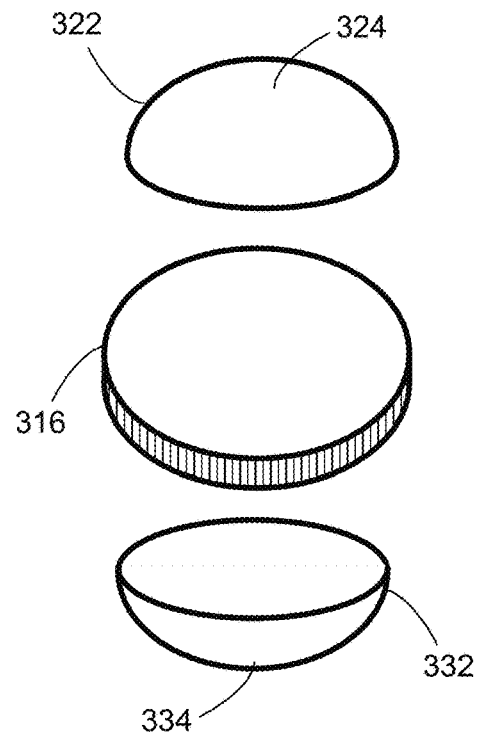

FIGS. 3A and 3B illustrate piezoelectric devices in accordance with some embodiments.

FIG. 3A illustrates a piezoelectric device with a donut-shaped piezoelectric element 310. The piezoelectric element 310 is coupled with supporting structures 320 and 330 (e.g., diaphragms). In some cases, the supporting structures 320 and 330 receive a force (e.g., a compressive force) and convert the direction of the force (e.g., into a radial direction of the piezoelectric element 310, which can increase the electrical signal generated by the piezoelectric elements. In some embodiments, the electrical signal from the piezoelectric element 310 is measured from two opposite ends 312 and 314 of the piezoelectric element 310. In some embodiments, the electrical signal from the piezoelectric element 310 is measured from two opposite surfaces of the piezoelectric element 310 (e.g., a top surface and a bottom surface). In some embodiments, the supporting structures 320 and 330 are made of an elastic material (e.g., a spring metal).

Although FIG. 3A illustrates a piezoelectric device with a donut-shaped piezoelectric element 310, a piezoelectric element having different shapes may be used. For example, a disc-shaped piezoelectric element 316 shown in FIG. 3B or a piezoelectric element having any other shape may be used.

In addition, although FIG. 3A illustrates supporting structures 320 and 330, which may be formed by bending rectangular plates, supporting structures 320 and 330 may have other shapes, such as a portion of a spherical shell (e.g., a half-dome of a spherical shell as shown in FIG. 3B), a portion of an ellipsoidal shell, a curved cross formed by bending cross-shaped plates, etc.

FIG. 4 illustrates a piezoelectric device 400 in accordance with some embodiments. The piezoelectric device 400 is configured for mounting on a tube or rod 410 (e.g., a spoke or any tubular or rod-shaped element of a frame of a bicycle, such as a top tube, a down tube, a seat tube, a seat stay, a chain stay, a head tube, and a fork, or a frame of any other vehicle, or a tubular or rod-shaped component of a mechanical structure of a building or a machinery, etc.).

For example, a longitudinal cross-sectional view of the piezoelectric device 400 in FIG. 5 shows that the piezoelectric device 400 includes a tubular element 510, which defines a hollow inner space into which at least a portion of a tube or rod may be inserted for coupling. In some embodiments, the tubular element 510 defines a through-hole, through which the tube or rod may extend from one end of the tubular element 510 to an opposite end of the tubular element 510.

The piezoelectric device 400 also includes one or more supporting structures 520 (e.g., a diaphragm, such as a metal plate) and one or more piezoelectric elements 530, a piezoelectric element of which is coupled with a supporting structure of the one or more supporting structures 520 (e.g., the piezoelectric element may be positioned on an inner surface of the diaphragm facing the tubular element 510).

Figure 7A:
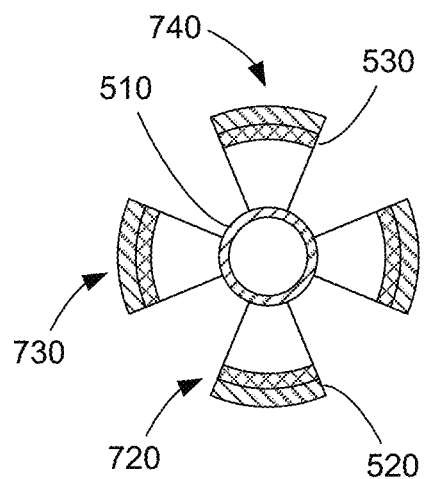
FIG. 7A is a cross-sectional view of a piezoelectric device in accordance with some embodiments.
Figure 7B:
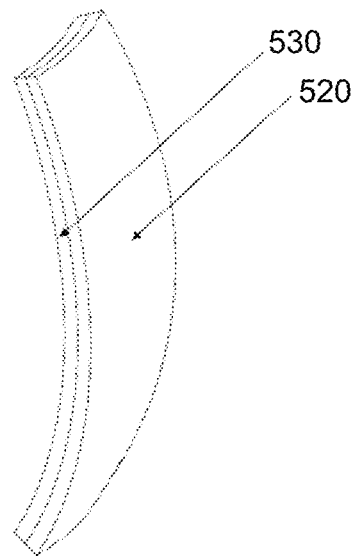
FIG. 7B illustrates a section of a piezoelectric device in accordance with some embodiments.
Figure 7C:
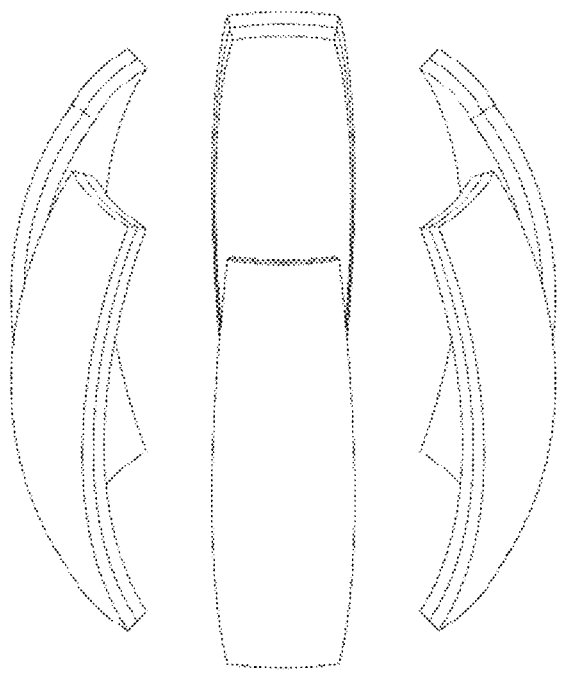
FIG. 7C illustrates sections of a piezoelectric device in accordance with some embodiments.

A transversal cross-sectional view of the piezoelectric device 400 in FIG. 6 shows that the supporting structure 520 and the piezoelectric element 530 extend circumferentially to the tubular element 510 (e.g., the supporting structure 520 and the piezoelectric element 530 wrap around the tubular element 510). In some embodiments, the piezoelectric device 400 may include more than one supporting structure and more than one piezoelectric element. For example, the cross-sectional view of a piezoelectric device in FIG. 7A shows a piezoelectric device with four non-consecutive sections 710, 720, 730, and 740, each section having a respective supporting structure 520 (e.g., a diaphragm) and a respective piezoelectric element 530 as shown in FIG. 7B. Although FIG. 7A shows a piezoelectric device with four sections, the piezoelectric device may have other numbers of sections, such as two, three, five, six, seven, eight, nine, ten, or more. For example, FIG. 7C illustrates a piezoelectric device with six sections. In FIG. 7C, the tubular element 510 is not shown so as not to obscure other aspects of the piezoelectric device.

Figure 8:
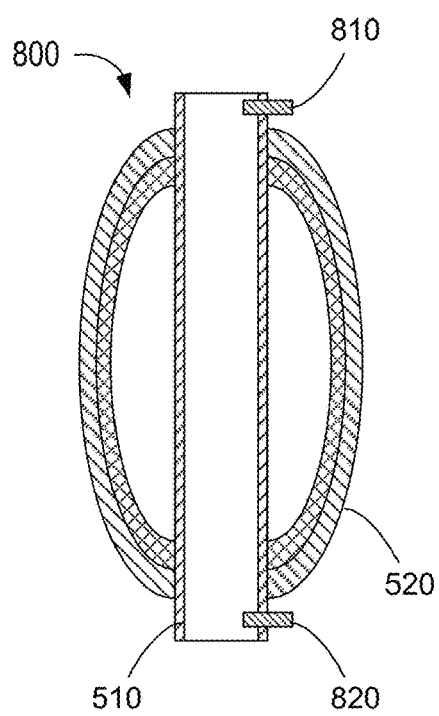
FIG. 8 is a cross-sectional view of a piezoelectric device in accordance with some embodiments.

FIG. 8 is a cross-sectional view of a piezoelectric device 800 in accordance with some embodiments. The piezoelectric device 800 is similar to the piezoelectric device 400, except that the piezoelectric device 800 includes a first mount 810 and a second mount 820 so that the piezoelectric device 800 may be firmly coupled (e.g., clamped, mounted, or attached) by using at least one of the first mount 810 or the second mount 820. For example, in some embodiments, at least one of the first mount 810 or the second mount 820 includes a screw that is inserted into a thread hole of the tubular element 510 so that the screw secures the piezoelectric device onto a tube or rod inserted into a hole defined by the tubular element 510 (e.g., by friction or by inserting a portion of the screw into a hole defined in the tube or road). In some embodiments, other types of mounts, such as clamps (e.g., spring-loaded clamps) or friction mounts, may be used in addition to, or instead of, the mounting screws. In some embodiments, the tubular element 510 of the piezoelectric device 800 extends beyond the supporting structure 520 to provide a space for the first mount 810 and the second mount 820.

Figure 9:
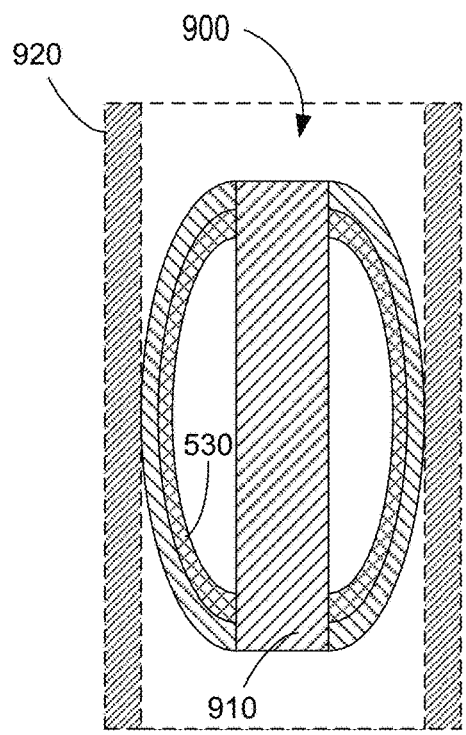
FIG. 9 is a cross-sectional view of a piezoelectric device positioned inside a spoke in accordance with some embodiments.

FIG. 9 is a cross-sectional view of a piezoelectric device 900 positioned inside a spoke in accordance with some embodiments. The piezoelectric device 900 is similar to the piezoelectric device 400 except that a rod-shaped element 910 may be used instead of the tubular element 510. When the spoke, having a shape of a tube, receives a compressive force or a tensile force, the inner diameter of the tube may change due to the Poisson effect (e.g., steel has a Poisson's ratio between 0.27 and 0.30 and aluminum alloy may have a Poisson's ratio of approximately 0.32). The change in the inner diameter of the tube changes the strain in the piezoelectric element 530 of the piezoelectric device 900, and thus, the change in the strain in the piezoelectric element 530 is detected by the electrical signal from the piezoelectric element 530.

Figure 10:
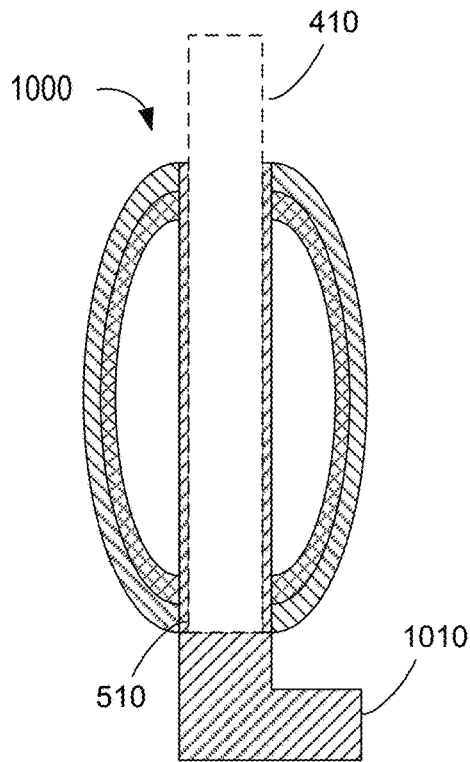
FIG. 10 is a cross-sectional view of a piezoelectric device with a hub hook in accordance with some embodiments.

FIG. 10 is a cross-sectional view of a piezoelectric device 1000 with a hub hook 1010 in accordance with some embodiments. The piezoelectric device 1000 is similar to the piezoelectric device 400 except that one end of the piezoelectric device (e.g., one end of the tubular element 510) is mechanically coupled with the hub hook 1010. In some embodiments, the hub hook 1010 is configured for coupling with the hub hole 142 of the hub 140 (e.g., the diameter of the hub hook 1010 is smaller than the diameter of the hub hole 142 so that the hub hook 1010 can be inserted into the hub hole 142).

Figure 11:
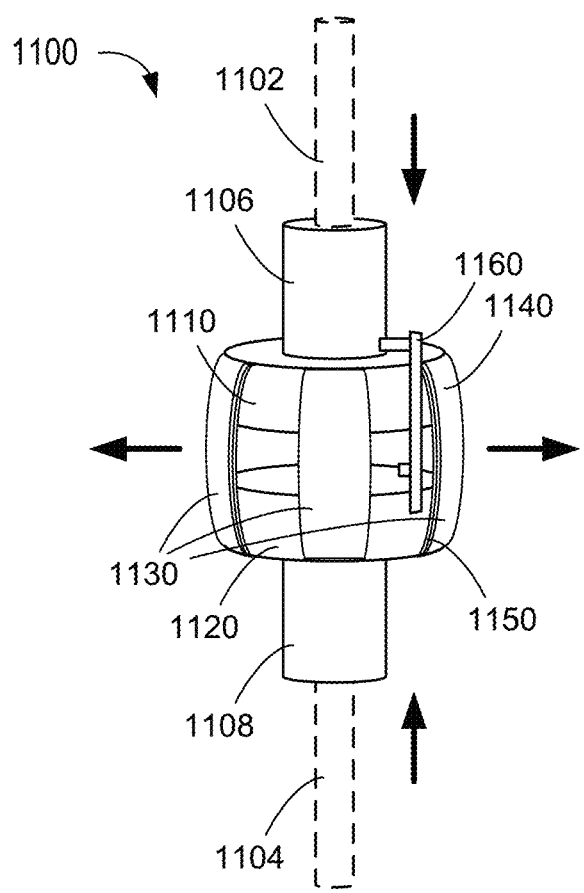
FIGS. 11 and 12 illustrate piezoelectric devices with bumpers in accordance with some embodiments.
Figure 12:
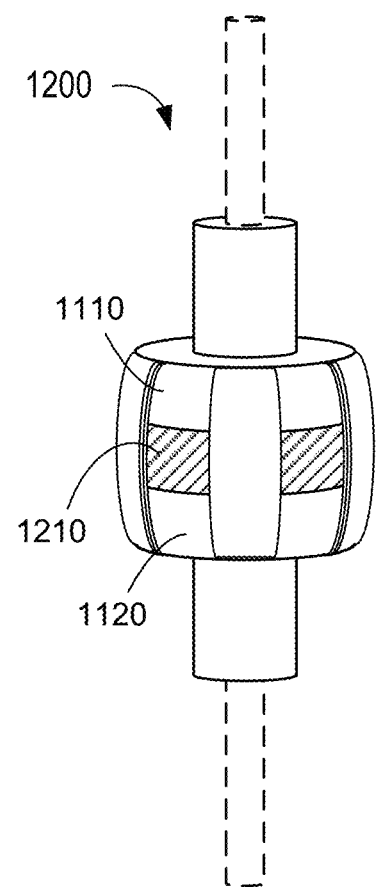

FIGS. 11 and 12 illustrate piezoelectric devices with bumpers in accordance with some embodiments. In some embodiments, instead of a single spoke extending from a rim to a hub of a wheel, two discrete spokes 1102 and 1104 connected by a piezoelectric device connector (e.g., a piezoelectric device 1100 or 1200) are used.

The piezoelectric device 1100 includes bumpers 1110 and 1120 (also called plungers) coupled by one or more sections 1130. Each section 1130 includes a supporting structure 1140 (e.g., a diaphragm) coupled with a piezoelectric element 1150 so that a compressive force or a tensile force on the piezoelectric device 1100 (applied by the spokes 1102 and 1104) causes strain in the piezoelectric element 1150. The piezoelectric element 1150 generates an electrical signal in response to the strain. As the compressive force on the piezoelectric device 1100 increases, the bumpers 1110 and 1120 move closer to each other until they contact each other. While the bumpers 1110 and 1120 contact each other, any additional compressive force on the piezoelectric device 1100 does not further increase the strain on the piezoelectric element 1150. In some embodiments, a spacing between the bumpers 1110 and 1120 is selected to limit the strain on the piezoelectric element 1150. This reduces or prevents excessive bending of the piezoelectric element 1150, which, in turn, reduces damages to the piezoelectric element 1150 and increases the lifetime of the piezoelectric element 1150.

In some embodiments, the piezoelectric device 1100 also includes a stopper 1160 for limiting the movement of the bumpers 1110 and 1120. The use of the stopper 1160 allows limiting the movement of the bumpers 1110 and 1120 independent of the spacing between the bumpers 1110 and 1120. Thus, the spacing between the bumpers 1110 and 1120 may be selected to generate a particular level of electrical signals, whereas the stopper 1160 is used to limit the movement of the bumpers 1110 and 1120 to reduce damages to the piezoelectric element 1150.

In some embodiments, the piezoelectric device 1100 includes couplers 1106 and 1108 for coupling the spokes 1102 and 1104, respectively.

The piezoelectric device 1200 is similar to the piezoelectric device 1100, except that the piezoelectric device 1200 includes an elastomeric material 1210 positioned between the bumpers 1110 and 1120. The elastomeric material 1210 reduces or eliminates a mechanical shock associated with a direct contact between the bumpers 1110 and 1120.

Figure 13:
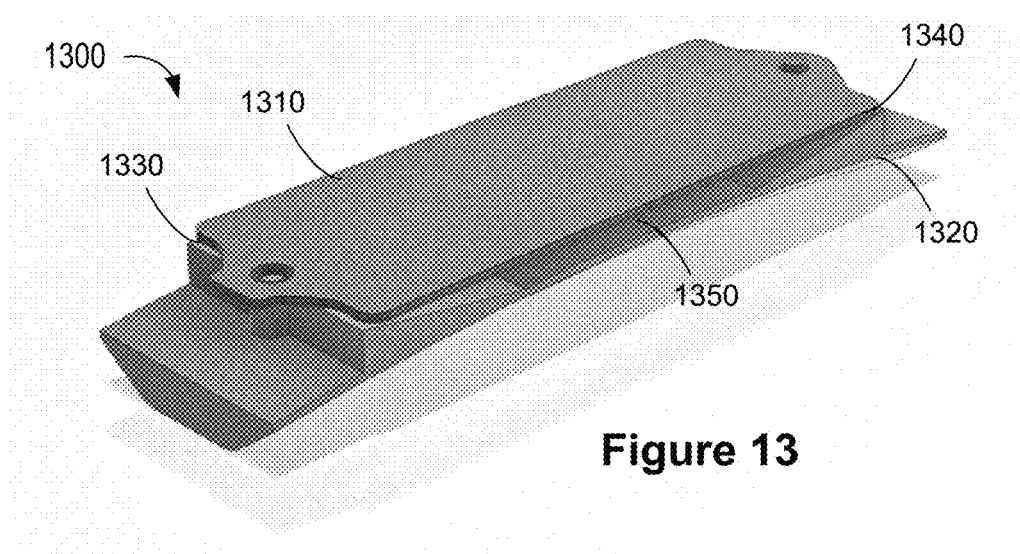
FIG. 13 illustrates a piezoelectric device for mounting on a rim of a wheel in accordance with some embodiments.

FIG. 13 illustrates a piezoelectric device 1300 for mounting on a rim of a wheel in accordance with some embodiments. The piezoelectric device 1300 includes a piezoelectric element 1310 and a support structure 1320. In FIG. 13, the piezoelectric element 1310 has a substantially planar shape. The support structure 1320 has a non-planar upper surface. In FIG. 13, the upper surface of the support structure 1320 includes two end sections 1330 and 1340 configured to support the piezoelectric element 1310 (e.g., from two opposite ends). The upper surface of the support structure 1320 also includes a middle section 1350 that is located between end sections 1330 and 1340 and spaced apart from the piezoelectric element 1310. This configuration allows the piezoelectric element 1310 to bend or vibrate in response to mechanical forces (e.g., mechanical forces on the rim) or inertial forces, which, in turn, facilitates generation of electrical signals (or electrical energy). In some embodiments, the support structure 1320 includes only one anchor section so that the piezoelectric element 1310 is supported at only one end.

Figure 14:
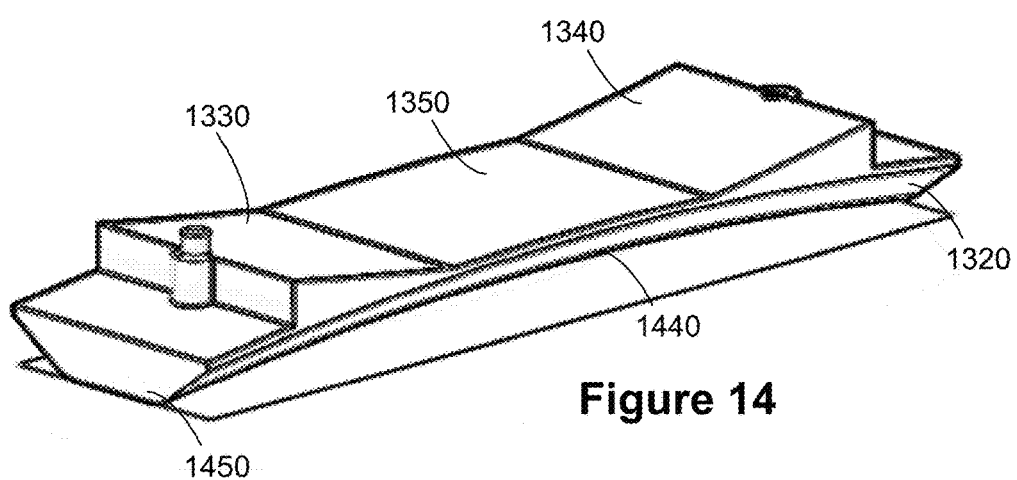
FIG. 14 illustrates a support structure of the piezoelectric device shown in FIG. 13.

FIG. 14 illustrates the support structure 1320 shown in FIG. 13. FIG. 14 shows that the bottom surface of the support structure 1320 has a curvature 1440. In some embodiments, the curvature 1440 is configured to match a curvature of a rim so that the support structure 1320 can be mounted on the rim. FIG. 14 also shows that an end section 1450 of the support structure 1320 may have a shape for coupling with the rim.

Figure 15:
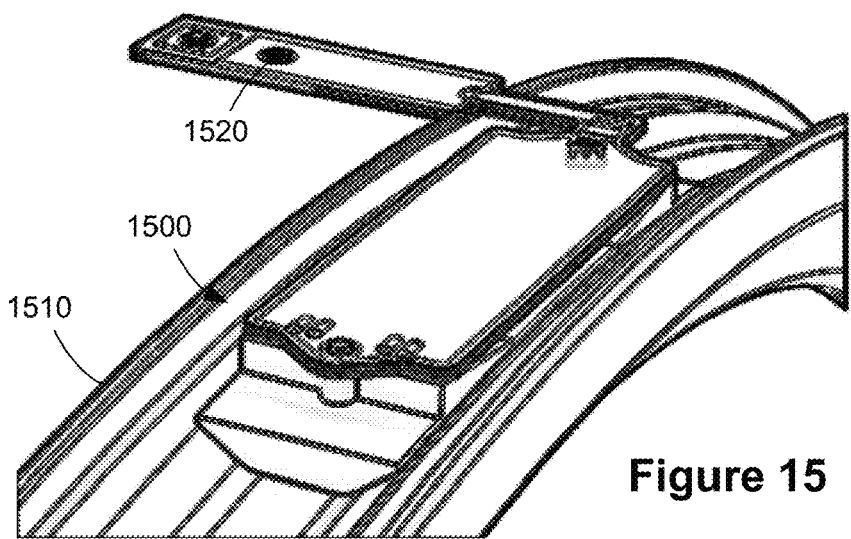
FIG. 15 illustrates a piezoelectric device mounted on a rim of a wheel in accordance with some embodiments.

FIG. 15 illustrates a piezoelectric device 1500 mounted on a rim 1510 of a wheel in accordance with some embodiments. The piezoelectric device 1500 is similar to the piezoelectric device 1300, except that the piezoelectric element 1310 is coupled to a tail 1520 for providing electrical signals to an area outside the rim. As explained above, the curvature and the shape of the end section of the support structure 1320 facilitates mounting of the support structure 1320 (and hence, the piezoelectric device 1500) onto the rim 1510.

Figure 16:
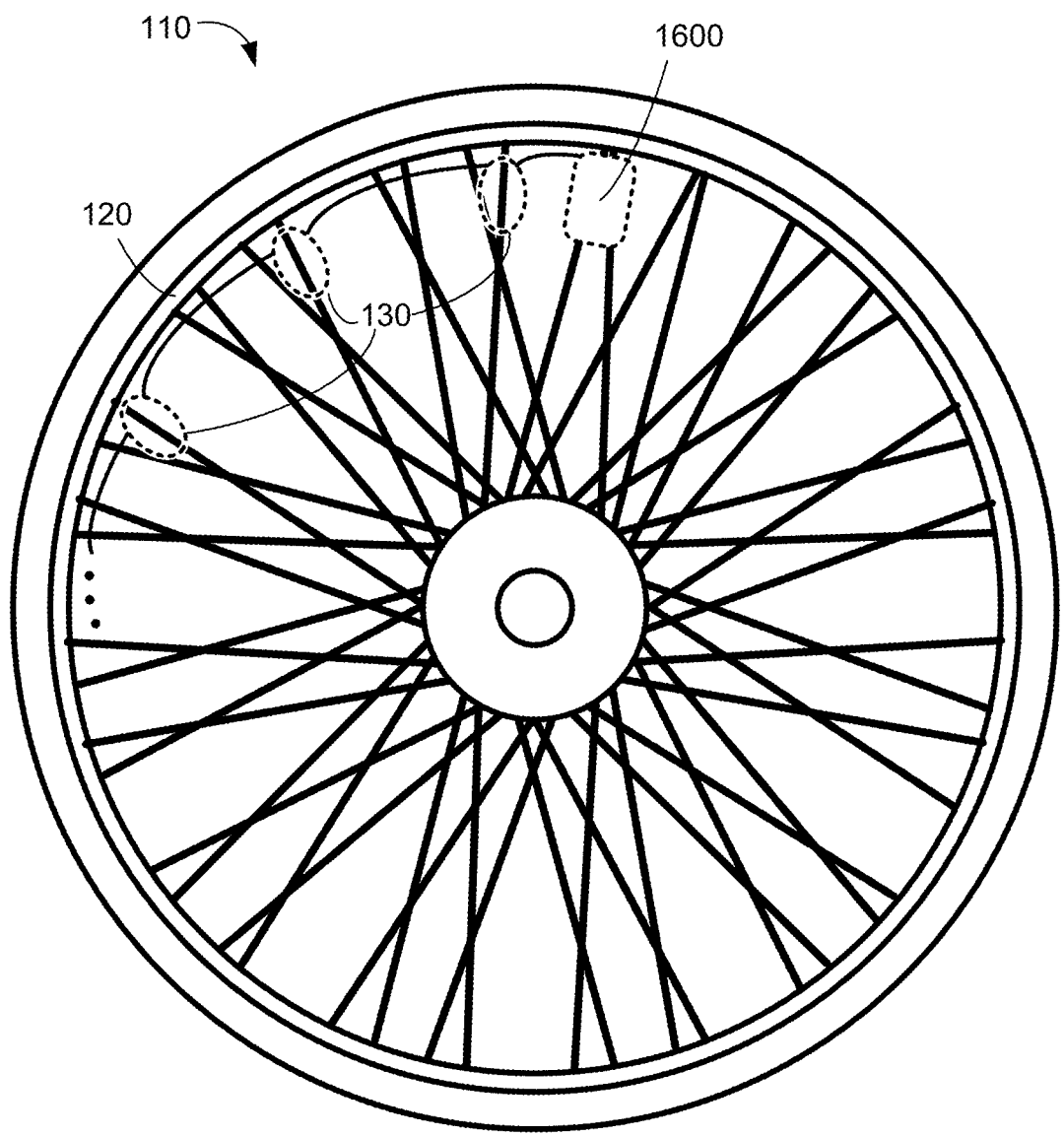
FIG. 16 illustrates multiple piezoelectric devices mounted on a wheel in accordance with some embodiments.

FIG. 16 illustrates multiple piezoelectric devices mounted on a wheel 110 in accordance with some embodiments. FIG. 16 shows that the wheel 110 has a rim 120 with a plurality of spokes and a plurality of piezoelectric devices 130. In FIG. 16, each piezoelectric device 130 is coupled with a respective spoke, and the piezoelectric devices 130 are electrically connected to one another (e.g., using jumper wires or cables). In some embodiments, the piezoelectric devices 130 are electrically coupled in series. In some embodiments, the piezoelectric devices 130 are electrically coupled in parallel. In some embodiments, the wheel 110 includes a plurality of spokes, including a first spoke with two or more piezoelectric devices (e.g., similar to the piezoelectric devices 130 mounted on a single spoke as shown in FIG. 1) and a second spoke with one or more piezoelectric devices.

In some embodiments, the wheel 110 also includes an electronic device 1600. In some embodiments, the electronic device 1600 includes one or more processors (e.g., microprocessors). In some embodiments, the one or more processors receive electrical power from the piezoelectric devices 130 for operation of the one or more processors. In some embodiments, the one or more processors receive electrical signals from the piezoelectric devices 130. In some embodiments, the one or more processors analyze the received electrical signals (e.g., for determining forces on the mechanical structure, such as the rim, and/or movement of the mechanical structure).

In some embodiments, the electronic device 1600 includes one or more communication interfaces (e.g., wired communication circuit and/or wireless communication circuit) for transmitting the electrical signals to another wireless communication circuit located away from the wheel.

Figure 17:
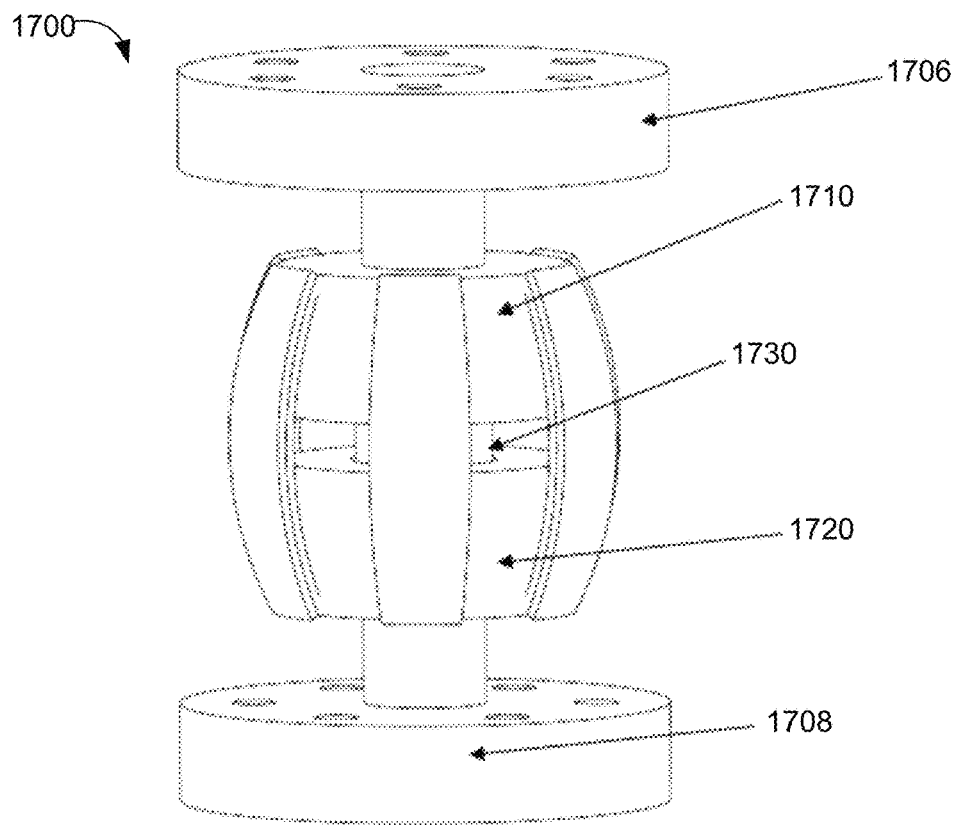
FIG. 17 illustrates a piezoelectric device in accordance with some embodiments.

FIG. 17 illustrates a piezoelectric device 1700 in accordance with some embodiments. The piezoelectric device 1700 is similar to the piezoelectric device 1100. In FIG. 17, the piezoelectric device 1700 includes flanges 1706 and 1708 for mounting onto other mechanical structures. In some embodiments, other coupling mechanisms may be used. In some embodiments, the piezoelectric device 1700 also includes a bearing and/or a damper 1730. In some embodiments, the bearing and/or the damper are used to carry linear and axial loads. In some embodiments, the piezoelectric device 1700 may be sized to support a large mechanical structure (e.g., buildings, bridges, and industrial structures, such as tiles embedded inside the road, on the surface of the road, or integrated into reflector tiles, etc.).

Figure 18:
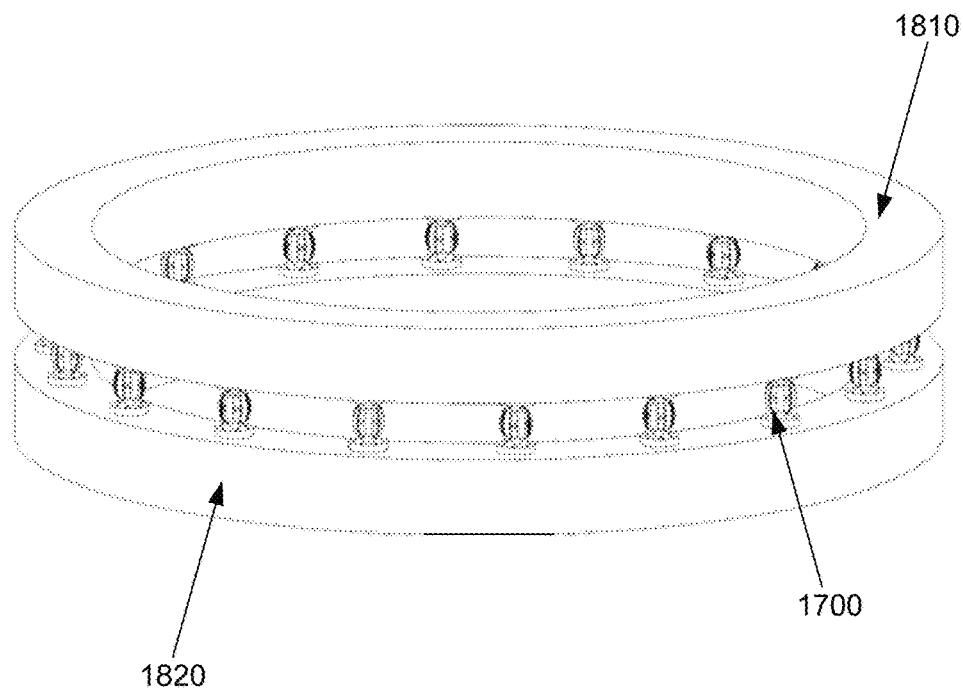
FIG. 18 illustrates a mechanical structure that includes the piezoelectric device shown in FIG. 17.

FIG. 18 illustrates a mechanical structure that includes the piezoelectric device shown in FIG. 17. The mechanical structure includes an upper mounting ring 1810 and a lower mounting ring 1820 coupled by a plurality of piezoelectric devices 1700. In FIG. 18, the plurality of piezoelectric devices 1700 is arranged circumferentially around the mounting rings 1810 and 1820. In some embodiments, the mechanical structure shown in FIG. 18 is used in a wind turbine. For example, the upper mounting ring 1810 may be coupled to a windmill blade and the lower mounting ring 1820 may be coupled to a turbine hub. As the blades rotate, the weight of the blades apply compressive forces and tensile forces alternatingly on the plurality of piezoelectric devices of the mechanical structure on each rotation of the blades. This allows the piezoelectric devices to generate power, which can be provided to the sensors and actuators mounted on or adjacent to the windmill blade. In addition, the piezoelectric device 1700 may be used as sensors, which can provide stress or strain information. The stress or strain information can be used to determine the stress, strain, or torque applied to the connection between the mounting rings 1810 and 1820 (corresponding to the stress, strain, or torque applied to the joint between the turbine hub and the blade).

In light of these examples and principles explained herein, we now turn to certain embodiments.

In accordance with some embodiments, a piezoelectric device (e.g., a piezoelectric device mountable on a rigid mechanical structure) includes one or more piezoelectric elements (e.g., piezoelectric element 310) and one or more supporting structures (e.g., a supporting structure 320). A respective supporting structure of the one or more supporting structures has a non-flat surface and is mechanically coupled with a piezoelectric element of the one or more piezoelectric elements so that a mechanical force on the one or more supporting structures is converted into an electrical signal by the one or more piezoelectric elements. In some embodiments, the piezoelectric device is configured for mounting on a mechanical structure (e.g., a vehicle, such as a bicycle, an automobile, a train, a ship, and an airplane, or other mechanical structures, such as buildings, bridges, road reflector tiles, etc.). In some embodiments, the mechanical structure includes a rigid mechanical structure (e.g., having a Young's modulus greater than 10, 20, 30, 40, 50, 60, 70, 80 90, 100, 110, 120, 130, 140, 150, 160, 170, 180, 190, 200, 210, 220, 230, 240, 250, 260, 270, 280, 290, 300, 350, 400, 450, 500, 550, 600, etc.). This allows the piezoelectric device to utilize the stress and/or strain in the mechanical structure for energy harvesting and/or serve as a sensor for monitoring the stress and/or strain in the rigid mechanical structure.

In some embodiments, the piezoelectric element includes a piezoelectric material having a shape of a ring or a disc with two opposite surfaces (e.g., the piezoelectric element 310 having a top surface and a bottom surface). In some embodiments, at least one of the two opposite surfaces is a planar surface.

The one or more supporting structures include one or more diaphragms (e.g., the supporting structure 320 having a shape of a diaphragm). A respective diaphragm is coupled to a respective surface of the two opposite surfaces of the piezoelectric material. In some embodiments, the respective diaphragm is coupled to a peripheral (e.g., circumferential) region of the ring or disc (e.g., the supporting structure 320 is coupled to the piezoelectric element 310 to the peripheral region of the piezoelectric element 310 toward the two opposite ends 312 and 314).

In some embodiments, the respective diaphragm has a non-flat surface so that the respective diaphragm is coupled to the piezoelectric material along a peripheral region of the respective diaphragm. In some embodiments, a central region of the of the respective diaphragm is positioned away from the piezoelectric material (e.g., FIG. 3A).

In some embodiments, the piezoelectric device is configured for mounting adjacent to a rod-shaped element and another element (e.g., between a spoke and a rim of the vehicle, as shown in FIG. 2). In some embodiments, the piezoelectric device includes a mechanical coupling for (i) a nipple hole of the rim or (ii) the spoke. For example, a diaphragm of the piezoelectric device may include a protrusion for coupling into the nipple hole of the rim on a spoke face of the rim. Additionally or alternatively, a diaphragm of the piezoelectric device may include a thread for coupling with the spoke.

In some embodiments, the piezoelectric device also includes a tubular or rod-shaped element (e.g., the tubular element 510 shown in FIG. 5). The one or more supporting structures include one or more diaphragms. A respective diaphragm is coupled to a circumferential surface of the tubular or rod-shaped element. The piezoelectric element includes a piezoelectric material coupled to a diaphragm of the one or more diaphragms.

In some embodiments, the tubular or rod-shaped element has a first end and a second end that is opposite to the first end. The respective diaphragm and the piezoelectric material extend from the first end of the tubular or rod-shaped element to the second end of the tubular or rod-shaped element.

In some embodiments, the piezoelectric device also includes a first mount (e.g., mount 810) positioned adjacent to a first end of the tubular or rod-shaped element, and a second mount (e.g., mount 820) positioned adjacent to a second end, opposite to the first end, of the tubular or rod-shaped element.

In some embodiments, the tubular or rod-shaped element is a tubular element, and the piezoelectric device is configured for mounting on a rod-shaped element (e.g., a spoke or a rod portion of a hub hook of a vehicle) by allowing the rod-shaped element to pass through the tubular element (e.g., FIG. 4).

In some embodiments, the piezoelectric device is configured for mounting within a hollow rod (e.g., the piezoelectric device 900 mounted within a spoke 920 as shown in FIG. 9). In some embodiments, the piezoelectric device has a rotational symmetry about an axis of symmetry that extends along the tubular or rod-shaped element.

In some embodiments, the piezoelectric device also includes a first bumper and a second bumper that is distinct and separate from the first bumper (e.g., the bumpers 1110 and 1120 shown in FIG. 11). The respective supporting structure has a first end coupled to the first bumper and a second end that is opposite to the first end and coupled to the second bumper.

In some embodiments, the first bumper and the second bumper are separated by a particular distance (e.g., when no force is applied on the piezoelectric device) so that the first bumper and the second bumper may move toward each other.

In some embodiments, the piezoelectric device also includes a stopper (e.g., stopper 1160) coupled with the first bumper or the second bumper.

In some embodiments, the piezoelectric device also includes an elastomeric material (e.g., elastomeric material 1210) positioned between the first bumper and the second bumper.

In some embodiments, the piezoelectric device is configured for mounting on a frame of a vehicle (e.g., top tube, down tube, seat tube, seat stay, chain stay, head tube, fork, crank arm, etc. as shown in FIG. 1).

In some embodiments, the non-flat surface of the respective supporting structure is positioned to face the one or more piezoelectric elements so that two ends of the one or more piezoelectric elements are mounted to the non-flat surface of the respective supporting structure and a middle portion of the one or more piezoelectric elements is separated from the respective supporting structure (e.g., FIG. 13).

In some embodiments, the respective supporting structure has a second non-flat surface (e.g., a bottom surface) opposite to the non-flat surface for mounting on a rim.

In accordance with some embodiments, a piezoelectric device system includes two or more piezoelectric devices (e.g., FIG. 1 or FIG. 16).

In some embodiments, the two or more piezoelectric devices are mounted on a single spoke (e.g., FIG. 1).

In some embodiments, the two or more piezoelectric devices are mounted on respective spokes (e.g., FIG. 16).

In accordance with some embodiments, a method for generating electrical signals includes providing a mechanical force on a piezoelectric device so that the one or more piezoelectric elements of the piezoelectric device generate electrical signals and providing the electrical signals from the piezoelectric device. In some embodiments, the electrical signals are provided to power one or more electrical components. In some embodiments, the electrical signals are provided to an electrical circuit to convert the electrical signals into a power line voltage. In some embodiments, the electric signals provide information indicating mechanical movement (e.g., vibration or deformation) of a portion of a vehicle on which the piezoelectric device is mounted.

Some embodiments may be described with respect to the following clauses:

Clause 1. A piezoelectric device mountable on a rigid mechanical structure, the piezoelectric device comprising:
  one or more piezoelectric elements; and
  one or more supporting structures, a respective supporting structure of the one or more supporting structures having a non-flat surface and being mechanically coupled with a piezoelectric element of the one or more piezoelectric elements so that a mechanical force on the one or more supporting structures is converted into an electrical signal by the one or more piezoelectric elements.

Clause 2. The piezoelectric device of clause 1, wherein:
  the piezoelectric element includes a piezoelectric material having a shape of a ring or a disc with two opposite surfaces; and
  the one or more supporting structures include one or more diaphragms, a respective diaphragm coupled to a respective surface of the two opposite surfaces of the piezoelectric material.

Clause 3. The piezoelectric device of clause 2, wherein:
  the respective diaphragm has a non-flat surface so that the respective diaphragm is coupled to the piezoelectric material along a peripheral region of the respective diaphragm.

Clause 4. The piezoelectric device of clause 2 or 3, wherein:
  the piezoelectric device is configured for mounting adjacent to a rod-shaped element and another element.

Clause 5. The piezoelectric device of clause 1, further comprising:
  a tubular or rod-shaped element, wherein:
    the one or more supporting structures include one or more diaphragms, a respective diaphragm coupled to a circumferential surface of the tubular or rod-shaped element; and
    the piezoelectric element includes a piezoelectric material coupled to a diaphragm of the one or more diaphragms.

Clause 6. The piezoelectric device of clause 5, wherein:
  the tubular or rod-shaped element has a first end and a second end that is opposite to the first end; and the respective diaphragm and the piezoelectric material extend from the first end to the second end.

Clause 7. The piezoelectric device of clause 5 or 6, further comprising:
a first mount positioned adjacent to a first end of the tubular or rod-shaped element; and
a second mount positioned adjacent to a second end, opposite to the first end, of the tubular or rod-shaped element.

Clause 8. The piezoelectric device of any of clauses 5-7, wherein:
the tubular or rod-shaped element is a tubular element; and
the piezoelectric device is configured for mounting on a rod-shaped element by allowing the rod-shaped element to pass through the tubular element.

Clause 9. The piezoelectric device of any of clauses 5-8, wherein:
the piezoelectric device is configured for mounting within a hollow rod.

Clause 10. The piezoelectric device of clause 1, further comprising:
a first bumper; and
a second bumper that is distinct and separate from the first bumper, wherein the respective supporting structure has a first end coupled to the first bumper and a second end that is opposite to the first end and coupled to the second bumper.

Clause 11. The piezoelectric device of clause 10, wherein:
the first bumper and the second bumper are separated by a particular distance so that the first bumper and the second bumper may move toward each other.

Clause 12. The piezoelectric device of clause 10 or 11, further comprising:
a stopper coupled with the first bumper or the second bumper.

Clause 13. The piezoelectric device of any of clauses 10-12, further comprising:
an elastomeric material positioned between the first bumper and the second bumper.

Clause 14. The piezoelectric device of any of clauses 10-13, wherein:
the piezoelectric device is configured for mounting on a frame of a vehicle.

Clause 15. The piezoelectric device of clause 1, wherein:
the non-flat surface of the respective supporting structure is positioned to face the one or more piezoelectric elements so that two ends of the one or more piezoelectric elements are mounted to the non-flat surface of the respective supporting structure and a middle portion of the one or more piezoelectric elements is separated from the respective supporting structure.

Clause 16. The piezoelectric device of clause 15, wherein:
the respective supporting structure has a second non-flat surface opposite to the non-flat surface for mounting on a rim.

Clause 17. A piezoelectric device system, comprising:
two or more piezoelectric devices, a respective piezoelectric device of the two or more piezoelectric devices corresponding to the piezoelectric device of any of clauses 1-16.

Clause 18. The piezoelectric device system of clause 17, including two or more piezoelectric devices are mounted on a single spoke.

Clause 19. The piezoelectric device system of clause 17 or 18, including two or more piezoelectric devices are mounted on respective spokes.

Clause 20. A method for generating electrical signals, the method comprising:
providing a mechanical force on the piezoelectric device of any of clauses 1-16 so that the one or more piezoelectric elements of the piezoelectric device generate electrical signals; and
providing the electrical signals from the piezoelectric device to power one or more electrical components or to provide information indicating mechanical movement of, or force applied on, a portion of an object on which the piezoelectric device is mounted.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles of the various described embodiments and their practical applications, to thereby enable others skilled in the art to best utilize the principles and the various described embodiments with various modifications as are suited to the particular use contemplated.

What is claimed is:

1. A piezoelectric device mountable on a rigid mechanical structure, the piezoelectric device comprising:
one or more supporting structures configured to mount to a component along a longitudinal axis such that the one or more supporting structures are deformed by tensile and compressive forces from the component along an axial direction; and
one or more piezoelectric elements mechanically coupled with the one or more supporting structures so that deformation of the one or more supporting structures is converted into an electrical signal by the one or more piezoelectric elements, wherein the one or more supporting structures are mechanically coupled to a largest surface of each piezoelectric element of the one or more piezoelectric elements such that the one or more supporting structures convert a direction of the tensile and compressive forces from the axial direction to a radial direction.

2. The piezoelectric device of claim 1, wherein:
the one or more piezoelectric elements includes a piezoelectric material having a shape of a ring or a disc with two opposite surfaces; and
the one or more supporting structures include one or more diaphragms, a respective diaphragm coupled to a respective surface of the two opposite surfaces of the piezoelectric material.

3. The piezoelectric device of claim 2, wherein:
the respective diaphragm has a non-flat surface so that the respective diaphragm is coupled to the piezoelectric material along a peripheral region of the respective diaphragm.

4. The piezoelectric device of claim 1, wherein:
the component comprises a rod-shaped element.

5. The piezoelectric device of claim 1, wherein:
the component comprises a tubular or rod-shaped element;
the one or more supporting structures include one or more diaphragms; and
the one or more piezoelectric elements includes a piezoelectric material coupled to a diaphragm of the one or more diaphragms.

6. The piezoelectric device of claim 5, wherein:
the tubular or rod-shaped element has a first end and a second end that is opposite to the first end; and
the longitudinal axis extends from the first end to the second end.

7. The piezoelectric device of claim 6, further comprising:
a first mount configured to be positioned at a first location along the longitudinal axis of the tubular or rod-shaped element; and
a second mount configured to be positioned at a second location along the longitudinal axis of the tubular or rod-shaped element.

8. The piezoelectric device of claim 5, wherein:
the piezoelectric device is configured for mounting on the tubular or rod-shaped element by allowing the tubular or rod-shaped element to pass through a through-hole of the piezoelectric device.

9. The piezoelectric device of claim 1, wherein:
the component comprises a hollow rod; and
the piezoelectric device is configured for mounting within the hollow rod.

10. The piezoelectric device of claim 1, further comprising:
a first bumper; and
a second bumper that is distinct and separate from the first bumper, wherein a respective supporting structure of the one or more supporting structures has a first end coupled to the first bumper and a second end that is opposite to the first end and coupled to the second bumper.

11. The piezoelectric device of claim 10, wherein:
the first bumper and the second bumper are separated by a particular distance so that the first bumper and the second bumper may move toward each other.

12. The piezoelectric device of claim 10, further comprising:
a stopper coupled with the first bumper or the second bumper.

13. The piezoelectric device of claim 10, further comprising:
an elastomeric material positioned between the first bumper and the second bumper.

14. The piezoelectric device of claim 1, wherein:
the component is part of a vehicle.

15. The piezoelectric device of claim 1, wherein:
a non-flat surface of a respective supporting structure of the one or more supporting structures is positioned to face the one or more piezoelectric elements so that two ends of the one or more piezoelectric elements are mounted to the non-flat surface of the respective supporting structure and a middle portion of the one or more piezoelectric elements is separated from the respective supporting structure.

16. The piezoelectric device of claim 15, wherein:
the respective supporting structure has a second non-flat surface opposite to the non-flat surface for mounting on a rim.

17. A piezoelectric device system, comprising:
two or more piezoelectric devices, each piezoelectric device of the two or more piezoelectric devices comprising:
a supporting structure configured to mount to a spoke along a longitudinal axis such that the supporting structure is deformed by tensile and compressive forces from the spoke along an axial direction; and
a piezoelectric element mechanically coupled with the supporting structure so that deformation of the supporting structure is converted into an electrical signal by the piezoelectric element, wherein the one or more supporting structures are mechanically coupled to a largest surface of the piezoelectric element such that the one or more supporting structures convert a direction of the tensile and compressive forces from the axial direction to a radial direction.

18. The piezoelectric device system of claim 17, wherein the two or more piezoelectric devices are mounted on a single spoke.

19. The piezoelectric device system of claim 17, wherein the two or more piezoelectric devices are mounted on respective spokes.

20. A method, comprising:
providing a tensile or compressive mechanical force to a supporting structure of a piezoelectric device along an axial direction;
converting, via the supporting structure, a direction of the tensile or compressive mechanical force from the axial direction to a radial direction so that one or more piezoelectric elements of the piezoelectric device generate electrical signals; and
providing the electrical signals from the piezoelectric device to power one or more electrical components or to provide information indicating mechanical movement of, or force applied on, a portion of an object on which the piezoelectric device is mounted.

* * * * *